(No Model.)
C. W. SEDWICK.
SCROLL SAWING MACHINE.
No. 398,803. Patented Feb. 26, 1889.
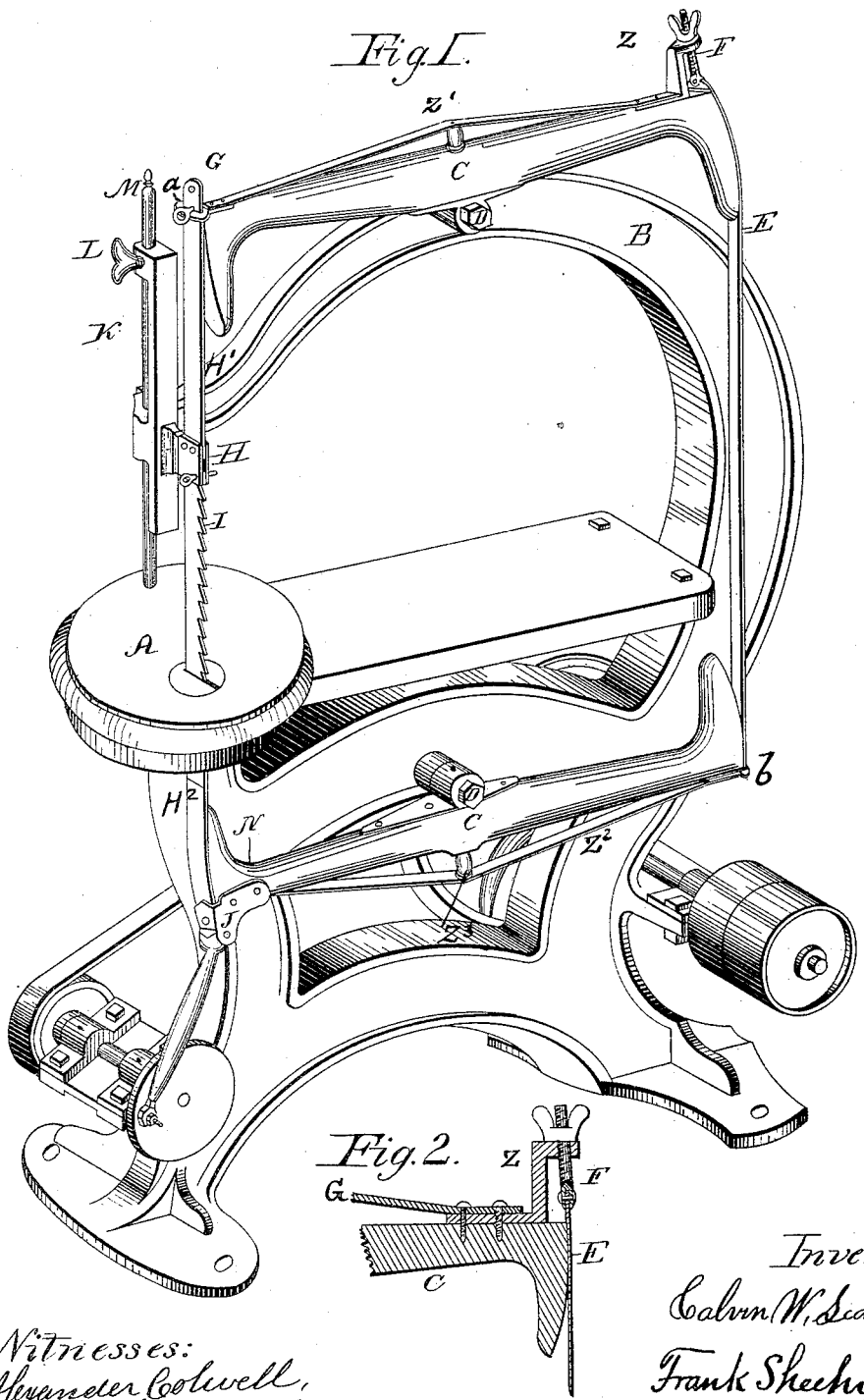
Witnesses:
Alexander Colwell,
J. S. Sedwick,
Inventor:
Calvin W. Sedwick
Frank Sheehy,
Attorney.

UNITED STATES PATENT OFFICE.

CALVIN W. SEDWICK, OF CALLENSBURG, PENNSYLVANIA, ASSIGNOR OF ONE-HALF TO E. E. ELLIOTT, OF SAME PLACE.

SCROLL-SAWING MACHINE.

SPECIFICATION forming part of Letters Patent No. 398,803, dated February 26, 1889.

Application filed September 24, 1886. Serial No. 214,465. (No model.)

*To all whom it may concern:*

Be it known that I, CALVIN W. SEDWICK, a citizen residing in the borough of Callensburg, in the county of Clarion and State of Pennsylvania, have invented a new and useful Scroll-Sawing Machine, of which the following is a specification.

My invention relates to improvements in sawing-machines, which will be fully understood from the following description and claim, when taken in connection with the annexed drawings, in which—

Figure 1 is a perspective view of my improved machine complete, and Fig. 2 is a sectional detail of the device for tightening the saw.

A represents the table; B, the frame on which the entire machine is hung; C C, the two beams—the one above the saw and the other below the saw—and on a downward motion the lower beam draws the saw down, and on an upward motion the upper beam draws the saw up, thus doing away entirely with the breaking of saws which is so common in other machines; D D, the central axes, on which the beams oscillate with little friction, causing the machine to run with but very little power; E, the steel strap which connects on tightening-screw F on back end of upper beam; G, the half-steel strap on front end of upper beam, connected with saw-strap H'; and H, saw-clamp connected with saw I, with steel strap H², that connects on lower end of saw and connects to the knuckle J at upper end of pitman, all of which are adjustable by the manipulating of the tightening-screw F on back end of upper beam. Thus by this mode of tightening the saw the saw can be very thin, which will be a great saving in lumber over other machines. The adjustable foot and saw-slide supporter K is on front end of metal frame, the slide holding the saw up to the work, and by the manipulation of the thumb-screw L the foot M can be raised or lowered to suit any thickness of lumber.

For the purpose of securing great lightness and at the same time strength and rigidity of the beams C C, I employ bracing-straps G Z². The bracing-strap G of the upper beam C is secured at its rear end to the bracket Z, through which the tightening-screw F is tapped, which bracket is rigidly secured to the said beam. The front end of this strap G is also secured to its beam and provided with a loop, *a*, through which passes the upper saw-strap, H', to which loop the latter strap is connected by a removable pin. At or near the middle of the length of the upper beam C and its strap G is a post, Z', technically known as a "straining-post." The lower beam C is also provided with a strap, Z², the rear end of which is secured to the same piece, *b*, to which the strap E is secured. The front end of this lower bracing-strap, Z², is secured to the knuckle J, and at the middle of the length of the strap Z² in a straining-post, Z³.

What I claim as my invention, and desire to secure by Letters Patent, is—

The within-described scroll-sawing machine, consisting of the main supporting-frame having the overhanging arm B, the upper and lower oscillating beams, C C, each provided with bracing-straps and straining-posts, the straining-strap, its adjusting-screw F, the bracket Z, the two straps H' H², the slide H, the adjustable guide, the saw I, the vertical back guide forming part of the arm B and provided with vertical apertures, the adjustable pressure-rod, and the set-screw for securing said rod, substantially as specified.

CALVIN W. SEDWICK.

Witnesses:
ALEXANDER COLWELL,
JOSHUA S. SEDWICK.